May 8, 1956 H. W. HULTS 2,744,984
SEALING MEANS FOR LEVER OPERATED ELECTRIC SWITCHES
Filed Aug. 12, 1953
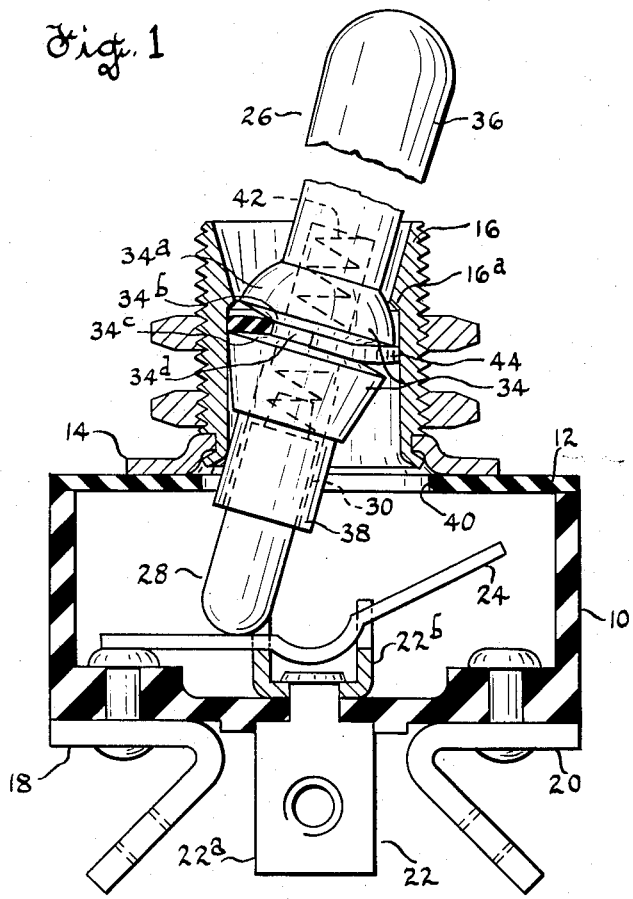
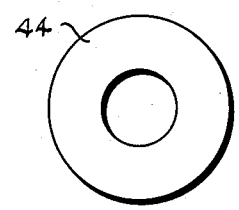
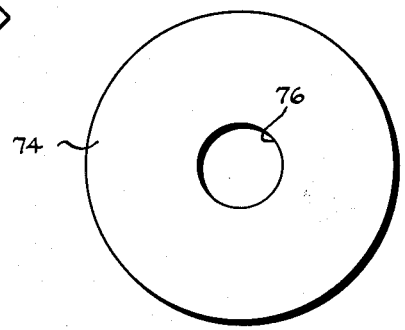
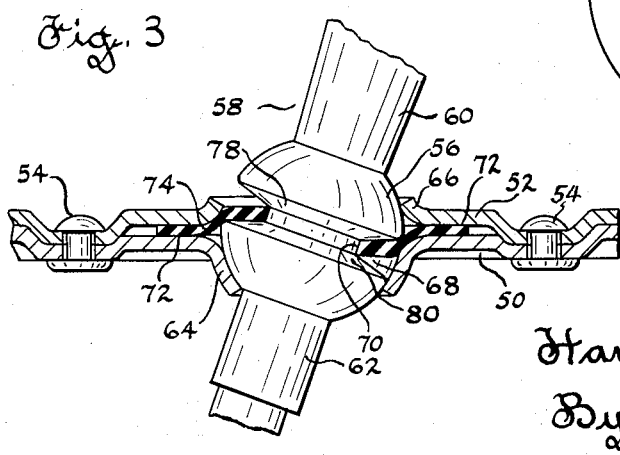
Inventor
Harold W. Hults
By W. E. Lyon
Attorney

United States Patent Office 2,744,984
Patented May 8, 1956

2,744,984

SEALING MEANS FOR LEVER OPERATED ELECTRIC SWITCHES

Harold W. Hults, Milwaukee, Wis., assignor to Cutler-Hammer, Inc., Milwaukee, Wis., a corporation of Delaware Application August 12, 1953, Serial No. 373,705

5 Claims. (Cl. 200—168)

This invention relates to improvements in electric switches and parts therefor; and it relates particularly to improved means for sealing casings of electric switches against entry of liquids and other foreign matter.

A primary object of the invention is to provide improved sealing means for actuator openings in switch casings.

Another object is to provide long-lived and highly effective seals for actuator openings in switch casings at low manufacturing cost.

A more specific object is to provide a seal for switch casing openings which will effectively seal the switch over wide temperature and pressure ranges such as are encountered in aircraft (especially military aircraft) operation without substantial change in the operating force required to actuate the switch.

Other objects and advantages of the invention will hereinafter appear.

Certain of these objects are realized by arrangement of the switch actuator and the switch casing in such manner that a very flexible seal member may be interposed between them and further by providing means to support the sealing member as required for different positions of the switch actuator without impairing its flexibility or unduly affecting the amount of force required to operate the actuator.

The accompanying drawings illustrate certain embodiments of the invention which will now be described, it being understood that other embodiments are possible and that certain modifications may be made in respect of the structural details of the embodiments illustrated without departing from the spirit or scope of the invention as defined in the appended claims.

In the drawings, Figure 1 is a view, partly in vertical section and partly in elevation, of an electric switch embodying the invention;

Fig. 2 is a plan view of a preferred form of the sealing member employed in the electric switch illustrated in Fig. 1, shown in relaxed condition.

Fig. 3 is a view, partly in vertical section and partly in elevation, of a fragment of an electric switch embodying the invention; and Fig. 4 is a plan view of a preferred form of the sealing member employed in the modified form of electric switch illustrated in Fig. 3, shown in relaxed condition.

Referring to Figs. 1 and 2 of the drawings, the switch shown includes a casing which comprises a recessed insulating base 10, an insulating cover plate 12, a supporting frame member 14, and an externally threaded bushing 16. The lower end of bushing 16 is of reduced diameter and is upset over the lower surface of an opening formed centrally of the switch supporting frame member 14. The latter and the cover plate 12 are secured and sealed together and to the base 10 in any well known manner.

The switch mechanism consists of three fixed contact assemblies 18, 20 and 22, which are secured to the bottom of base 10. Assemblies 18 and 20 are located on opposite sides of the common, central assembly 22, and each includes a terminal plate and a rivet. One head of the latter serves as the fixed contact tip. The central assembly 22 consists of a terminal plate 22$^a$ and a generally U-shaped pivot member 22$^b$. A portion of terminal plate 22$^a$ extends through the base 10 and pivot member 22$^b$ and is riveted over the latter to secure it in place against the bottom wall of the recess in base 10. The arms of the U-shaped pivot member 22$^b$ are notched to accommodate a rocking-type bridging contactor 24.

The switch actuating mechanism includes an actuating or operating lever, generally designated 26, and a bridging contactor operating plunger 28 which is slidably disposed in an elongated recess 30 formed in the lever 26 and opening to the lower end thereof. The operating lever 26 comprises: an enlarged rounded central section 34 which is disposed within the bushing 16; a handle 36, extending upwardly from the central portion 34 beyond the bushing 16 and a shank 38 extending downwardly from the central portion 34 and, through an elongated guide opening 40 in the cover plate 12, into the recess in base 10.

The upper portion 34$^a$ of the central section 34 is in the shape of a transverse segment of a sphere. An inwardly extending annular lip 16$^a$ is formed on the upper, inner surface of bushing 16. The lip 16$^a$ engages the spherical portion 34$^a$ and acts to retain the central section 34 of lever 26 within the bushing 16. Opening 40 is elongated in line with the bridging contactor member 24 thus to confine the oscillatory operation of lever 26 to a single plane. A coiled compression spring 42, which is disposed in recess 30 and held under compression between the upper end of recess 30 and the upper end of operating plunger 28, urges the spherical portion 34$^a$ of the central section 34 of lever 26 upwardly against lip 16$^a$ of bushing 16. Also, spring 42 urges the operating plunger 28 into engagement with the bridging contactor 24 to effect pivotal action of the latter as lever 26 is oscillated.

Below its spherical portion 34$^a$, the central section 34 of lever 16 is provided with an inwardly extending annular, V-shaped groove which provides an upper substantially conical surface 34$^b$ and a lower substantially conical surface 34$^c$. The inner circular end 34$^d$ of the groove is located substantially at the pivotal axis of lever 26. An annular elastic sealing member 44, shown in relaxed condition in Fig. 2, having an outer diameter normally appreciably greater than the inside diameter of bushing 16 and an inside diameter normally appreciably less than the diameter of the inner end 34$^d$ of said V-shaped groove, is disposed in the latter. The inner circular edge portion of the sealing member 44 elastically embraces or hugs the lever 26; and the outer periphery of said sealing member 44 engages a peripheral portion of the inner wall of bushing 16. Thus the sealing member 44 is held under lateral compression. This structure affords an inexpensive seal which is easily assembled with the switch components and which, under severe test, has been demonstrated to be dependable and long-lived.

The conical surface 34$^c$ affords an additional desirable feature. When the lever is moved to one side or the other of its central position, the inner portion of the sealing member will be tilted out of the horizontal plane substantially about the pivotal axis of lever 26. The position of the outer periphery of the sealing member will not change substantially relatively to the inner surface of the bushing 16. When lever 26 is in its right-hand position as shown, the inner circular edge portion of the sealing member 44 adjacent the inner end 34$^d$ of the groove will be moved below the horizontal plane on the right-hand side and above the horizontal plane on the left-hand side of the lever 26. Thus the right-hand side portion of the sealing member 44 has an upward tilt, while the left-hand side portion thereof has a downward tilt. Pressure exerted on the upper side of the sealing member 44 and tending to force the right-hand side of the latter downwardly is ineffective to do so since downward motion of said right-hand side results in increased compression of the sealing member against the bushing on that side. Such pressure might be effective to force the left-hand side of the sealing member downwardly because such downward motion would release said left-hand side from compression. However, said left-hand side of the sealing member 44 is supported against downward movement by the conical surface 34c which, when the operating lever is in its right-hand position, is tilted to engage portions of the left-hand side of the sealing member.

It will be understood that while the operation of sealing member 44 has been described for the right-hand position of lever 26, the mode of operation of the sealing member is identical except reversed when lever 26 is in its left-hand position.

Moreover, the normal outside diameter of the sealing member 44 is sufficiently great with respect to the inside diameter of the bushing 16, so that whatever the position of the lever 26, if the pressure acting on the sealing member 44 is sufficiently great to force it against either conical surface 34b or conical surface 34c, its outer peripheral edge remains in sealing engagement with the inner surface of the bushing.

Because of this feature, the sealing member may be made relatively thin and flexible so that it offers very little restraint against oscillatory motion of the lever. This feature assumes considerable importance in switches which are subjected to temperatures within the range between approximately 150° F. and —65° F. Also, the provision of the groove in the central portion 34 of lever 26 permits the use of a wide sealing member for flexibility without the need for increasing the bushing diameter. The sealing member may be formed as a flat washer or the like from a sheet of elastic material at low cost. While it is now considered preferable to form sealing member 44 in the shape of a flat washer, other forms, such for example as a toroidal ring, may be employed.

The switch casing may take various forms. For example, a casing of the character illustrated in Fig. 3 may be employed in lieu of bushing 16. This casing, only a fragment of which is shown in Fig. 3, comprises a cover plate 50 and a frame 52 which are secured together in any suitable manner, as by means of rivets 54. The cover plate 50 and frame 52 are provided with alined actuator openings within which is disposed the generally spherical ball portion 56 of an actuating or operating lever 58. Said lever further includes an operating handle 60 extending upwardly, and a shank portion 62 extending downwardly from the ball portion 56, respectively. Portions of each of the cover plate 50 and frame 52 around the periphery of their actuator openings are bent laterally downwardly and upwardly, respectively. These portions 64 and 66 jointly form a socket within which the ball portion 56 of the actuating lever can be pivoted about an axis extending through the center of said ball.

An inwardly extending annular V-shaped groove 68 is formed in the ball 56 in the plane of the pivotal center or axis of the latter. An elastic sealing member 74, like sealing member 44 in Figs. 1 and 2, having a central opening of a diameter normally less than the diameter of the ball 56 at the inner end 70 of groove 68, and having an outside diameter normally greater than the inside dimensions of the socket formed by portions 64 and 66 of the cover plate 50 and the frame 52, respectively, may be interposed between the inner end 70 of the groove 68 and the juncture between said portions 64 and 66. However, in the modified form of switch illustrated in Fig. 3 the cover plate 50 and the frame 52 are not contiguous in the region about their respective laterally bent portions 64 and 66. Instead, an outer peripheral portion 72 of the elastic sealing member 74 is interposed between and squeezed by them so that said peripheral portion elastically engages both the cover plate 50 and the frame 52 of the switch casing. The central opening 76 of sealing member 74, shown relaxed in Fig. 4, is of smaller diameter than the outer diameter of the inner end 70 of groove 68 and the latter is elastically embraced by the sealing member 74.

The groove 68 permits the actuating lever 58 to be oscillated without excessive stretching of the sealing member 74. Because of the support afforded the sealing member by the conical surfaces 78 and 80 at the respective sides of groove 68, said sealing member may be made from very thin and flexible material so that it will offer minimum resistance to operation of the actuating lever over wide ranges of temperature and yet may withstand the pressure differences occurring over wide ranges in altitude.

I claim:

1. In combination, a switch casing including a hollow supporting bushing, an oscillatable operating lever comprising a handle portion extending outwardly from said bushing, another portion extending into said casing, and an enlarged portion between the portions aforementioned, said enlarged portion having formed therein a substantially V-shaped peripheral groove, and a normally flat punched thin elastic sealing member compressively engaging an inner peripheral portion of the bushing and elastically embracing said operating lever at the vertex of said groove whereby said lever may be oscillated with minimum flexing of said elastic sealing member.

2. In an electric switch, an oscillatable operating lever having an enlarged portion intermediate the end thereof, a switch casing including a hollow supporting bushing, said bushing having an opening slightly larger than said enlarged portion of the lever and in which said enlarged portion is disposed, said enlarged portion of the lever having formed therein a substantially V-shaped groove, and an elastic sealing member compressively engaging an inner peripheral portion of the bushing and elastically embracing said operating lever at the vertex of said groove to provide an effective seal between said parts, the arrangement being such that said lever may be oscillated with minimum flexing of said elastic sealing member.

3. In an electric switch including a casing and a supporting bushing, said bushing having an opening formed therein to accommodate an oscillatable operating lever having an enlarged portion of circular contour disposed within said opening in the bushing, said enlarged portion having a substantially V-shaped groove formed in the outer periphery thereof, and an elastic sealing member in continuous sealing engagement with an inner peripheral portion of the bushing at said opening and elastically embracing the operating lever at the vertex of said groove for continuous sealing engagement therewith, the sides of said lever at said peripheral groove affording clearance between said sealing member and the lever to permit oscillation of the lever and affording additional support for intermediate portions of said sealing member in oscillated positions of said lever.

4. The structure defined in claim 3, in which said groove is formed in the plane of the axis about which said lever is oscillatable.

5. In an electric switch, in combination, an oscillatable operating lever having an enlarged intermediate portion of circular form in transverse cross section and a substantially V-shaped groove formed in the periphery of said enlarged portion substantially in the plane of the axis of oscillation of the lever, a switch supporting bushing having an opening of size to accommodate said enlarged portion of said lever and in which said enlarged portion is disposed, and a normally substantially flat punched elastic sealing member having a central opening at which the lever is elastically embraced by said member about the vertex of said V-shaped groove, an outer peripheral portion of said sealing member having continuous sealing engagement with an inner peripheral portion of the switch bushing in all positions of said lever.

References Cited in the file of this patent

UNITED STATES PATENTS

| | | |
|---|---|---|
| 2,587,747 | McCullough | Mar. 4, 1952 |
| 2,650,964 | Razdow | Sept. 1, 1953 |
| 2,698,887 | Shaw | Jan. 4, 1955 |

FOREIGN PATENTS

| | | |
|---|---|---|
| 329,447 | Great Britain | May 22, 1930 |